Nov. 12, 1940.  J. MIHALYI  2,221,030

CAMERA OBJECTIVE ATTACHING MECHANISM

Filed Nov. 15, 1938

JOSEPH MIHALYI
INVENTOR

BY

ATTORNEYS

Patented Nov. 12, 1940

2,221,030

UNITED STATES PATENT OFFICE 2,221,030

CAMERA OBJECTIVE ATTACHING MECHANISM

Joseph Mihalyi, Rochester, N. Y., assignor to Eastman Kodak Company, Rochester, N. Y., a corporation of New Jersey Application November 15, 1938, Serial No. 240,522

15 Claims. (Cl. 88—57)

This invention relates to photography, and more particularly for detachable connections between a photographic camera and objective.

One object of my invention is to provide a connection between a camera and an objective which will securely hold the objective against accidental displacement, but which will also permit the objective to be easily and quickly removed from the camera. Another object of my invention is to provide a latching connection between a camera and an objective by which the objective may be firmly and accurately positioned with respect to the focal plane of the camera. Still another object of my invention is to provide a latching mechanism between a camera and an objective in which the latching mechanism is largely concealed and in which the operating portion of the latch is in a position which will prevent accidental operation thereof. Still another object of my invention is to provide a small housing for the latching mechanism adjacent the bottom wall of the camera so that a portion of this housing may be used for a tripod support, and other objects will appear from the following specification, the novel features being particularly pointed out in the claims at the end thereof.

Coming now to the drawing, wherein like reference characters denote like parts throughout:

In cameras of the so-called miniature type and other cameras in which interchangeable objectives are used, it is very necessary to provide an objective latching mechanism which is readily operable so that different objectives can be rapidly interchanged, and it is also necessary to provide a means for definitely holding the objective on the camera with extreme accuracy. With lenses of wide aperture, and, in fact, with all objectives, it is necessary, for best results, to have the axis of the lens exactly perpendicular to the plane of the film lying in the exposure frame of the camera, and it is also necessary to have the objective spaced the exact required distance from a film lying in the focal plane, in order to obtain the best results. My present invention is particularly directed to a structure by which these requirements can be fulfilled.

Figure 1:
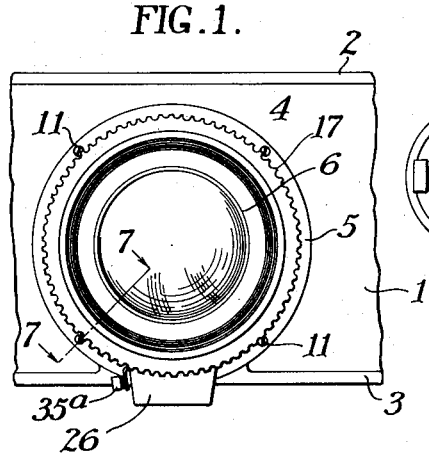
Fig. 1 is a fragmentary front elevation of a camera and a camera objective in which the objective is latched to the camera in accordance with a preferred embodiment of my invention.

As indicated in Fig. 1, the camera body may be designated as 1 and may be provided with a top wall 2 and a bottom wall 3. The front wall 4 may support a flanged annular member 5 which, in turn, supports an objective designated broadly as 6.

The camera may be provided with a film winding handle 7, which may also set the camera shutter, and a rewinding handle 8, although these parts do not form a part of the present invention.

Figure 7:
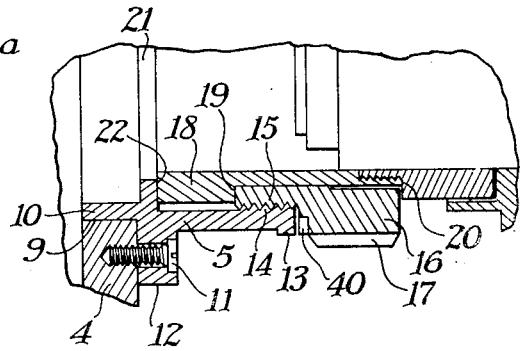
Fig. 7 is a fragmentary detail section on line 7—7 of Fig. 1.

Referring to Fig. 7, it will be seen that the front wall 4 of the camera is provided with a circular opening 9 into which a flange 10, extending inwardly from the annular member 5, extends, and there are a plurality of screws 11 attaching the flange 12 to the front wall 4 of the camera body.

As indicated in Fig. 1, the annular member 5 is definitely seated on the front wall 4 of the camera and forms a substantially permanent part thereof. This annular member also has a flange 13 extending around its outer periphery and a threaded area 14 internally of the end of the annular member. The thread 14 is adapted to mate with a similar but externally threaded area 15 of an annular member 16, serrated at 17 and being revolubly held on a lens tube 18, as indicated in Fig. 7, lying between the shoulders 19 and 20. These shoulders are spaced apart to permit the ring 16 to turn freely, but it cannot slide axially of the lens tube 18.

The annular member 5 has an inwardly projecting flange 21 which is very accurately alined with the focal plane of the camera, this flange forming a locating abutment for the end wall 22 of the lens tube 18. Thus, when the annular member 16 is turned so that the mating threads 14 and 15 engage, the lens tube 18 may be moved inwardly and clamped against the shoulder 21, thus definitely positioning the objective.

Figure 6:
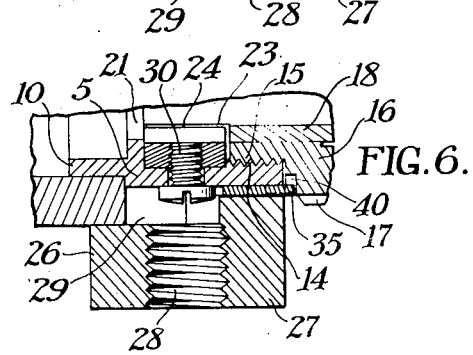
Fig. 6 is a section on line 6—6 of Fig. 3.

In order to prevent the lens tube 18 from turning, the structure shown in Fig. 6 may be used, wherein the lens tube 18 is slotted so that the two edge walls of the slot 23 may engage the two edge walls of the key 24 carried by the annular member 5. Thus, in inserting a lens into the camera, the walls 23 are engaged with the key walls 24 and the ring 16 is turned to locate the objective properly on the camera with the scales 25 in the desired position.

Figure 3:
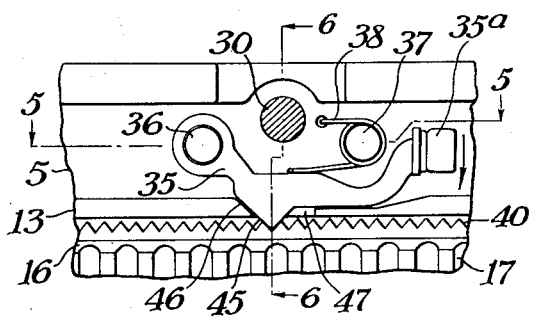
Fig. 3 is an enlarged fragmentary detail showing the latching parts with a portion of the housing removed.
Figure 4:
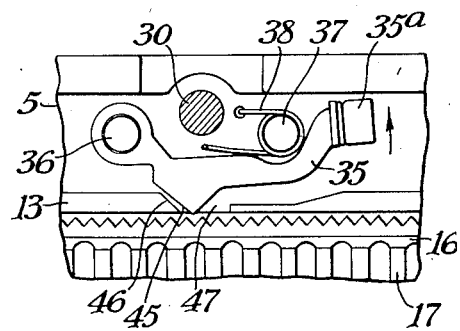
Fig. 4 is a view similar to Fig. 3, but with the latch held in an inoperative position.
Figure 5:
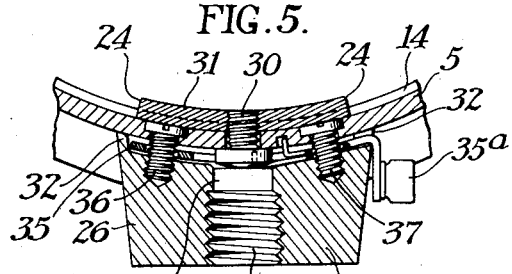
Fig. 5 is a section on line 5—5 of Fig. 3.

While the ring 16 definitely holds the objective in the desired position and is not liable, in itself, to become unscrewed or unseated, nevertheless, to definitely hold the objective in the desired position, the latching mechanism shown in Figs. 3 to 5 inclusive is provided.

On the underneath side of the annular member 5, a small housing, designated broadly as 26, is provided, this housing including a heavy bottom wall 27 in which a tripod thread 28 is cut, there being an aperture 29 extending through this wall so as to permit of the insertion of a screw 30 which holds the key member 31 having the guiding walls 24 in place, as shown in Fig. 5.

The two side walls of the member 27 are provided with flanges 32 which space the heavy wall 27 from the annular member 5 so that there is room for the latching mechanism to lie beneath the wall 27. The latching mechanism consists of a latch member 35, pivoted on screw 36 to the annular member 5, an opposite screw 37 being encircled by a spring 38 which normally thrusts the latch member 35 in the direction shown by the arrow in Fig. 3.

This latch member has a handle 35a extending down over a portion of the heavy wall 27, so that while it can be freely operated intentionally, it is normally in a position in which accidental operation is extremely unlikely.

The ring 16, as shown in Fig. 7, is provided with a series of serrations 40 which extend preferably entirely around the inner edge of the ring member 16 and at right angles to the thread 15. These serrations are in position to engage the latching member 35 after the objective has been almost entirely inserted into the annular member 5 so that during the last turn or fraction of a turn of the ring 16, the latching member 35 will ride over the serrations coming to rest in a serration when the ring 16 has been turned to its limit. Thus, the latch will prevent rearward movement of the ring 16 so that even if an attempt should be made to turn the ring 16 to release the objective from the camera, the latch 35 would prevent such turning movement unless moved from the position shown in Fig. 3 to the position shown in Fig. 4 against the pressure of spring 38.

In order to release the objective from the camera, it is only necessary to retract the latch member 35 for a very short period of time because after the ring 16 has been turned a small portion of the movement necessary to release the objective from the camera, the serrations will have moved out of the path of the latch 35 so that the ring will no longer be held.

The movement of latch 35 is limited in both directions, being limited, as indicated in Fig. 4, by the screw 37 and the spring 38 and being limited, as shown in Fig. 3, by the shoulder 45 coming in contact with a portion 46 cut from the flange 13.

It will be noticed that the flange 13 is entirely cut through at 47 to permit the latching member to pass through the flange and into engagement with the serrations 40, as best shown in Fig. 6.

The objective itself comprises a lens tube 18 with a freely rotatable ring 16 free to move thereon, but prevented from moving axially by the shoulders 19 and 20. The construction of the remainder of the lens tube may be of any standard type, as obviously such a structure would depend largely on the type of lenses and number of lenses used in the particular objective. The freely rotatable ring 16 must be provided with a thread 15 which mates with the camera thread and with serrations or teeth 40 in a position to be engaged by a camera latch. While I have found it highly desirable to form these teeth or serrations at right angles to the thread 15 or facing the camera body, this is not necessarily essential.

The camera comprises an annular member 5, mounted on the front wall, having a thread 14 for supporting the objective and an annular shoulder 21 for definitely locating the objective. In order, therefore, to properly fit an objective to a camera, it is only necessary to have the locating shoulder 21 of the camera manufactured with extreme accuracy and the rear wall 22 of the objective tube manufactured with extreme accuracy, since by bringing these two surfaces into engagement, the objective is definitely located in the proper relationship to the focal plane of the camera.

Figure 2:
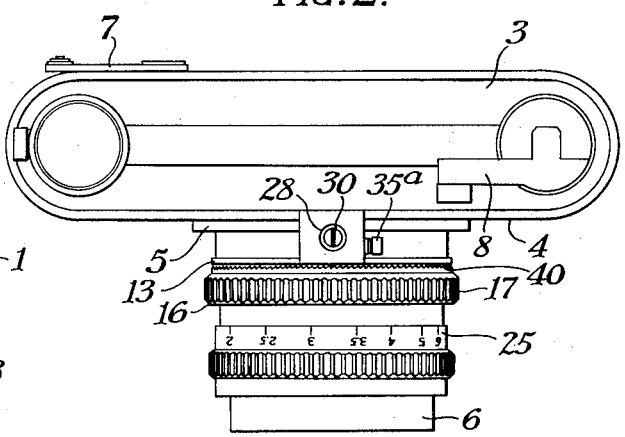
Fig. 2 is a bottom plan view of the camera shown in Fig. 1.

The operation of my improved objective and camera is extremely simple. In order to unmount the objective shown in Fig. 2, the handle 35 is moved toward the camera body and at the same time the knurling 17 is turned so that the thread 15 will ride away from the camera body on the mating thread 14. After the ring 16 has been turned a distance sufficient to move the serrations 40 away from the path of the latching member 35—and with a preferred form of thread, this may be less than 360°—the handle 35 may be released and the ring rapidly turned until the threads 14 and 15 separate so that the objective 6 may be removed.

In placing an objective on the camera, the lens tube 18 is positioned so that the walls 23 of the lens tube engage the key walls 24 of the key 31 and the ends of the threads 14 and 15 are engaged. The ring 16 is then rapidly turned, screwing the objective on the camera, and during the last part of the turning movement, the latching member 47 will slide over the serrations 40 until the objective is seated, in which position the latch 35 will definitely hold the ring 16 against reverse movement. This action is due to the relative location between the point of the latching element 35 and its pivotal support 36 which is so arranged that the latch acts much like a pawl working on ratchet teeth 40.

In any event, the objective is definitely latched in position and it is impossible to release the objective 6 by attempting to turn the ring 16, because the latch must be first released by moving the handle 35a to the position shown in Fig. 4.

What I claim is:

1. In an objective mount for cameras, the combination with a camera body, of a flanged objective seat carried thereby, said seat including a threaded part for the reception of a threaded objective mount, a latch member mounted on the camera body near the threaded part, a pivot for the latch member on which said latch may move to and from the camera body, means for limiting the movement of the latch constituting a stop and a spring normally thrusting the latch member from the camera body against its stop and in a position to engage serrations on an objective mount screwed into the threaded part for preventing accidental movement thereof.

2. In an objective mount for cameras, the combination with a camera body, of a flanged objective seat carried thereby, said seat including a threaded part for the reception of a threaded objective mount, a latch member mounted on the camera body near the threaded part, a pivot for the latch member on which said latch may move to and from the camera body, a small housing enclosing the latch, a latch operating handle projecting from the housing for operating the latch, an opening in the housing from which the latch extends, a spring for thrusting the latch at least partially through said opening and into a position to engage serrations on an objective mount screwed into the threaded part for preventing accidental operation thereof.

3. In an objective mount for cameras, the combination with a camera body, of a flanged objective seat carried thereby, said seat including a threaded part for the reception of a threaded objective mount, a latch member mounted on the camera body near the threaded part, a pivot for the latch member on which said latch may move to and from the camera body, a small housing enclosing the latch and including a heavy bottom wall having a tripod socket therein, means for holding the housing on the support, at least one of said means also constituting the pivot for said latch, a slot in the housing wall through which a part of the latch may project into an operative position, a second slot through which a handle may project for manually operating said latch, said handle being protected against accidental operation by a wall of the housing and a wall of the bus seat.

4. In an objective mount for cameras, the combination with a camera body, of a flanged objective seat carried thereby, said seat including a threaded part for the reception of a threaded objective mount, a latch member mounted on the camera body near the threaded part, a pivot for the latch member on which said latch may move to and from the camera body, a small housing enclosing the latch and including a heavy bottom wall having a tripod socket therein, means for holding the housing on the support, at least one of said means also constituting the pivot for said latch, another of said means constituting a spring support, a spring encircling said spring support and normally thrusting the latch in one direction about its pivot, a slot in the housing wall through which a part of the latch may project into an operative position under the impulse of the thrust of said spring, a second slot through which a handle may project for manually operating said latch, said handle being protected against accidental operation by a wall of the housing and a wall of the lens seat.

5. In an objective mount for cameras, the combination with a camera body, of a flanged objective seat carried thereby, said seat including a threaded part for the reception of a serrated and threaded objective mount, a latch member mounted on the camera body near the threaded part, a pivot for the latch member on which said latch may move to and from the camera body, means for limiting the movement of the latch forming a stop and a spring normally thrusting the latch member from the camera body against its stop, an objective mount, a thread carried thereby for engaging the seat thread, serrations on the mount positioned to engage said latch when said mount is screwed into the seat whereby accidental movement of said mounted objective is prevented.

6. In an objective mount for cameras, the combination with a camera body, of a flanged objective seat carried thereby, said seat including a threaded part for the reception of a threaded objective mount, a latch member mounted on the camera body near the threaded part, a pivot for the latch member on which said latch may move to and from the camera body, means for limiting the movement of the latch forming a stop and a spring normally thrusting the latch member from the camera body against its stop, an objective mount carrying lenses, a ring rotatably mounted thereon, a thread on the ring for mating with the thread on the seat, serrations on the mount adjacent the thread positioned to be engaged by the latch when the objective mount is screwed into the seat to prevent accidental movement thereof.

7. In an objective mount for cameras, the combination with a camera body, of a flanged objective seat carried thereby, said seat including a threaded part for the reception of a threaded objective mount, a latch member mounted on the camera body near the threaded part, a pivot for the latch member on which said latch may move to and from the camera body, means for limiting the movement of the latch forming a stop and a spring normally thrusting the latch member from the camera body against its stop, an objective mount carrying lenses, a ring rotatably and coaxially mounted thereon, a thread on the ring for mating with the thread on the seat, serrations on the mount adjacent the thread positioned to be engaged by the latch when the objective mount is screwed into the seat to prevent accidental movement thereof, and said serrations extending transversely of the thread and facing the camera body.

8. In an objective mount for cameras, the combination with a camera body, of a flanged objective seat carried thereby, said seat including a threaded part for the reception of a threaded objective mount, a latch member mounted on the camera body near the threaded part, a pivot for the latch member on which said latch may move to and from the camera body, means for limiting the movement of the latch forming a stop and a spring normally thrusting the latch member from the camera body against its stop, said latch constituting a pawl, an objective mount, a thread thereon for mating with the seat thread, serrations thereon forming ratchet teeth positioned to engage said pawl when said mount is screwed into the seat, the pawl and ratchet teeth being so shaped that movement in one direction can take place and movement in the other direction is prevented.

9. In an objective mount for cameras, the combination with a camera body, of a flanged objective seat carried thereby, said seat including a threaded part for the reception of a threaded objective mount, a latch member mounted on the camera body near the threaded part, a pivot for the latch member on which said latch may move to and from the camera body, means for limiting the movement of the latch forming a stop and a spring normally thrusting the latch member from the camera body against its stop, said latch constituting a pawl, an objective mount, a thread thereon for mating with the seat thread, serrations thereon forming ratchet teeth positioned to engage said pawl when said mount is screwed into the seat, the pawl and ratchet teeth being so shaped that the objective mount may be screwed into the seat with the pawl sliding idly over the ratchet teeth as the objective is seated, the latch handle being manually releasable to permit unscrewing of the objective from its mount.

10. In an objective mount for cameras, the combination with a camera body, of a flanged objective seat carried thereby, said seat including a threaded part for the reception of a threaded objective mount, a latch member mounted on the camera body near the threaded part, a pivot for the latch member on which said latch may move to and from the camera body, means for limiting the movement of the latch forming a stop and a spring normally thrusting the latch member from the camera body against its stop, said latch constituting a pawl, an objective mount, a thread thereon for mating with the seat thread, serrations thereon forming ratchet teeth positioned to engage said pawl when said mount is screwed into the seat, the pawl and ratchet teeth being so shaped that they may be operatively engaged only during the last part of the turning movement in screwing the objective in its seat to prevent reverse movement thereof.

11. In an objective mount for cameras including a body, a threaded flanged objective seat and an objective latch pivotally carried thereby, the combination with a tubular barrel carrying a plurality of lenses, a ring coaxially and revolvably mounted thereon, means carried by the barrel for restraining the ring against axial movement, a thread carried by the ring adapted to mate with the thread of the flanged seat, serrations on the ring adapted to engage the latch carried by the flanged seat when said objective mount is screwed into the threaded seat whereby unscrewing said objective barrel may normally be prevented.

12. In an objective mount for cameras including a body, a threaded flanged objective seat and an objective latch pivotally carried thereby, the combination with a tubular barrel carrying a plurality of lenses, a ring coaxially and revolvably mounted thereon, means carried by the barrel for restraining the ring against axial movement, a thread carried by the ring adapted to mate with the thread of the flanged seat, serrations on the ring and extending completely around said ring and adapted to engage the latch carried by the flanged seat when said objective mount is screwed into the threaded seat whereby unscrewing said objective barrel may normally be prevented.

13. In an objective mount for cameras including a body, a threaded flanged objective seat and an objective latch pivotally carried thereby, the combination with a tubular barrel carrying a plurality of lenses, a ring coaxially and revolvably mounted thereon, means carried by the barrel for restraining the ring against axial movement, a thread carried by the ring adapted to mate with the thread of the flanged seat, serrations formed radially on the ring and at right angles to the threaded area on the ring adapted to engage the latch carried by the flanged seat when said objective mount is screwed into the threaded seat whereby unscrewing said objective barrel may normally be prevented.

14. In a camera the combination of a camera, of a lens seat carried thereby, a locking pawl adjacent said seat, a threaded surface carried by the seat, an objective adapted to be fastened to the camera in said seat including a seat engaging wall, a threaded ring movably and coaxially mounted on the objective barrel, means for preventing axial movement of the ring on the barrel, serrations on the ring near the threaded area thereof, cooperating elements carried by the barrel and lens seat for guiding the latter from the former, said pawl being positioned to prevent movement of the ring in a direction to unseat the objective.

15. A removable lens mount for cameras including an interiorly threaded annular member forming a lens seat, a locking pawl adjacent said lens seat and a flange projecting inwardly therefrom, comprising a lens tube adapted to engage said flange, a threaded ring rotatably and coaxially carried by the lens tube having a thread mating with the interiorly threaded member of the camera, and an annular shoulder carried by the threaded ring carrying serrations for turning said ring to clamp the lens tube against the camera body, said annular shoulder including a plurality of serrations at right angles to the thread and positioned to be engaged by said latch member to hold the lens tube on the camera.

JOSEPH MIHALYI.